March 31, 1942. A. DE KOHAROVICH 2,278,062
SELF-LOCKING BOLT WITH ELASTIC WASHER OF VARIABLE THICKNESS
Filed April 5, 1939
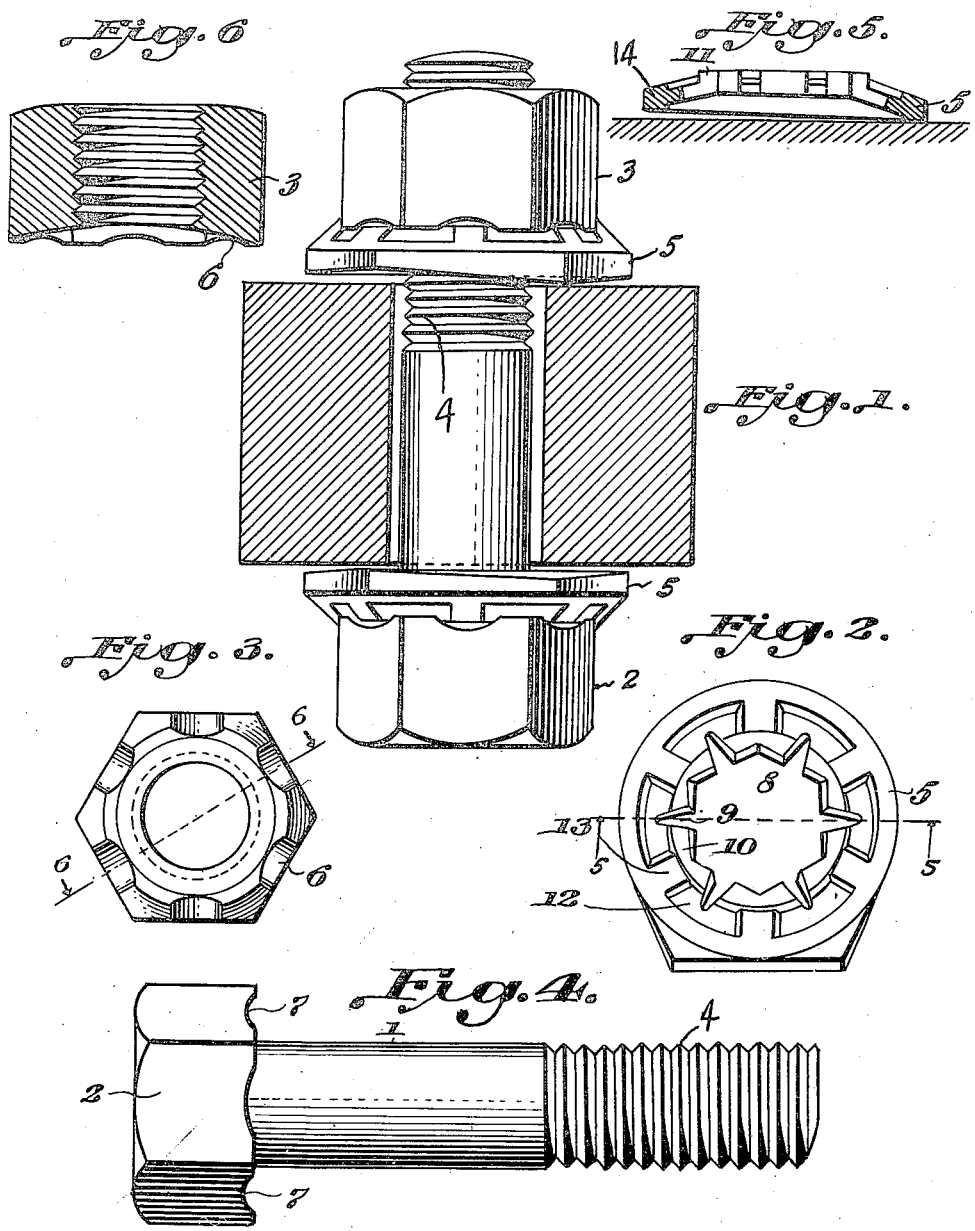
Inventor,
ALFREDO DE KOHAROVICH
By Young, Emery & Thompson
attys Patented Mar. 31, 1942

2,278,062

UNITED STATES PATENT OFFICE 2,278,062

SELF-LOCKING BOLT WITH ELASTIC WASHERS OF VARIABLE THICKNESS

Alfredo de Koharovich, Rio de Janeiro, Brazil

Application April 5, 1939, Serial No. 266,169
In Brazil March 2, 1939

4 Claims. (Cl. 151—38)

This invention relates to new and useful improvements in nut-locks and has particular reference to that type of lock in which a nut provided with a ratchet face is arranged for locking engagement with a ratchet washer.

An object of this invention is to provide a lock washer having a variable thickness about its circumference.

Another object of this invention is to devise a bolt and nut locking device in which the bolt head and nut have concave engaging faces provided with a series of recesses adjacent the periphery thereof and cooperating washers of variable thickness provided with radially inwardly extending tongues and with alternate radially extending recesses and ribs in the next engaging surface to cooperate with the recesses in the nut and bolt head.

With these and other important objects in view, which may be incident to my improvements, the invention resides in the parts and combinations to be hereinafter set forth and claimed.

In the drawing:

Figure 1 is a side elevation, illustrating the complete bolt with the nut and washers in locked relation.

Fig. 2 is a plan view of the washer.

Fig. 3 is a bottom view of the ratchet face of the nut in diassembled relation.

Fig. 4 is a side elevational view, illustrating the bolt shank.

Fig. 5 is a sectional view taken on line 5—5 of Fig. 2.

Fig. 6 is a sectional view taken on line 6—6 of Fig. 3.

As shown in the drawing, the invention is applied to a bolt 1 having a head 2 and a nut 3 which is mounted on the threads 4 formed on the shank thereof. Lock washers 5 are associated with the bolt head 2 and the nut 3.

As shown in Figs. 3 and 6, the under side or washer-engaging surface of the nut 3 is concave and a series of recesses 6 are provided in the washer-engaging surface adjacent the periphery thereof. In the structure shown in the drawing, the nut 3 is hexagonal and there are six recesses 6 provided. The washer-engaging surface of the bolt head 2 is constructed substantially identically to the nut 3, being concave and provided with recesses 7.

The washers 5, which are associated with the bolt head 2 and the nut 3, are constructed as clearly illustrated in Figs. 1, 2 and 5. These washers are substantially horseshoe shaped, as appears in Fig. 2, and are of variable thickness, as indicated in Figs. 1 and 5. In the latter figure, it is apparent that the left side of the washer is of less thickness than the right side thereof. Each washer has a hexagonal bolt-receiving aperture 8 formed therein and slits 9 extend radially outwardly from said aperture 8 to provide a plurality of elastic sections 10. As shown in the drawing, there are six slits 9 and, consequently, six elastic sectors 10.

Adjacent the aperture 8, washers 5 are provided with an upstanding annular flange or rib 11 which is severed by the slits 9. Flange 11 constitutes the uppermost portion of the washer and is adapted to engage the washer-engaging surface of the bolt head 2 and nut 3. Between the annular flange 11 and the periphery of the washer, a plurality of circumferentially spaced recesses 12 are provided in the upper surface thereof. These recesses are separated by radially extending ribs 13, the upper surface of the ribs 13 being in the same plane as the upper surface of the washer adjacent its periphery.

The reinforced outer edge 14 of the washer increases its rigidity. As illustrated in Fig. 5, the washer is of general frusto-conical shape in that the upper surface of said washer inclines inwardly and upwardly.

In use, the washers are assembled on the bolt shank together with the nut 3, as indicated in Fig. 1. The inclination of the upper surface of the washers is such that, upon threading the nut 3 on the shank of the bolt 1, the annular rib or flange 11 first engages the concave surfaces of the bolt head 2 and the nut 3. As the nut is further tightened, the washers 5 are distorted by forcing the inner portions thereof into the same plane as the outer portion thereof. After the inner portions of the washers are forced to a certain extent, the notched surfaces of the bolt head and nut are brought into engagement with the upper surface of the washer constituted by the alternate series of recesses 12 and radially extending ribs 13. Upon further tightening of the nut onto the bolt, the recesses 7 and 6, respectively, of the bolt head 2 and the nut 3 receive the radially extending ribs 13 of the washers and the portions of the bolt head and nut intermediate the respective recesses 7 and 6 are received in the recesses 12 of the washer, thus serving to prevent further relative rotation between the bolt head and its associated washer and between the nut and its associated washer.

In view of the fact that the washers 5 are of variable thickness, the lower surface thereof is not flat, but has alternate high and low portions, as clearly illustrated in Figs. 1 and 5. Because of this variable thickness, any rotary movement of the washer, which may be caused by vibration, would effect a reduction of the space in a transverse section of the same relative to the member against which the washer is pressed by the bolt head or nut, and in this way the pressure on the washer would be increased, preventing the same from becoming loose. In this manner, the bolt and nut assembly and the elements gripped thereby are maintained tight, thus affording full security against any tendency to become loose caused by vibration.

I claim:

1. In a single nut-lock, a nut having a concave washer-engaging surface provided with a series of equally spaced recesses adjacent the periphery thereof, and a single washer having a plurality of upwardly and inwardly extending resilient sectors, the inner ends of said sectors having an upstanding portion of an annular rib adapted to engage the concave surface of the nut and be pressed downwardly by said nut, said washer also having an annular series of ribs adapted to enter the recesses in the nut and recesses adapted to receive the portions of the nut intermediate the recesses of the latter.

2. In a bolt and screw lock, a bolt head having a concave washer-engaging surface provided with a series of equally spaced recesses adjacent the periphery thereof, and a single washer having a plurality of upwardly and inwardly extending resilient sectors, the inner ends of said sectors having an upstanding portion of an annular rib adapted to engage the concave surface of the bolt head and be pressed downwardly by said bolt head, said washer also having an annular series of ribs adapted to enter the recesses in the bolt head and recesses adapted to receive the portions of the bolt head intermediate the recesses of the latter.

3. In a single nut-lock, a nut having a concave washer-engaging surface provided with a series of equally spaced recesses adjacent the periphery thereof, and a single washer having a plurality of upwardly and inwardly extending resilient sectors, the inner ends of said sectors having an upstanding portion of an annular rib adapted to engage the concave surface of the nut and be pressed downwardly by said nut, said washer also having an annular series of ribs adapted to enter the recesses in the nut and recesses adapted to receive the portions of the nut intermediate the recesses of the latter, said washer being of varying thickness about its circumference.

4. In a bolt and screw lock, a bolt head having a concave washer-engaging surface provided with a series of equally spaced recesses adjacent the periphery thereof, and a single washer having a plurality of upwardly and inwardly extending resilient sectors, the inner ends of said sectors having an upstanding portion of an annular rib adapted to engage the concave surface of the bolt head and be pressed downwardly by said bolt head, said washer also having an annular series of ribs adapted to enter the recesses in the bolt head and recesses adapted to receive the portions of the bolt head intermediate the recesses of the latter, said washer being of varying thickness about its circumference.

ALFREDO DE KOHAROVICH.